INVENTORS.
CHARLES H. YOUNGBERG
HAROLD V. HANSEN
BY
ATTORNEY

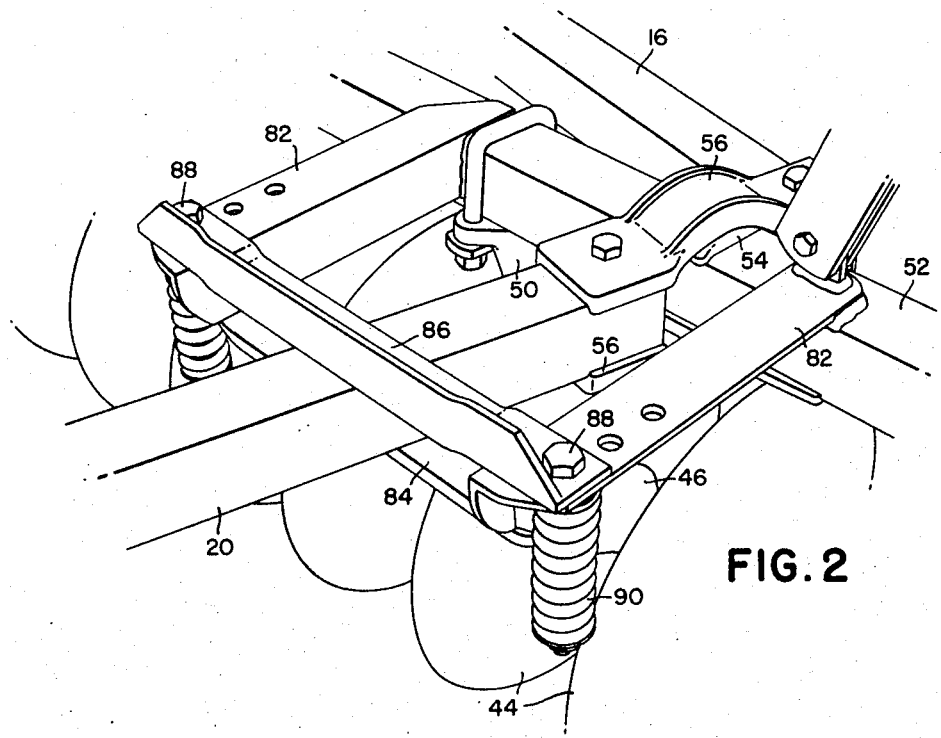
FIG. 2
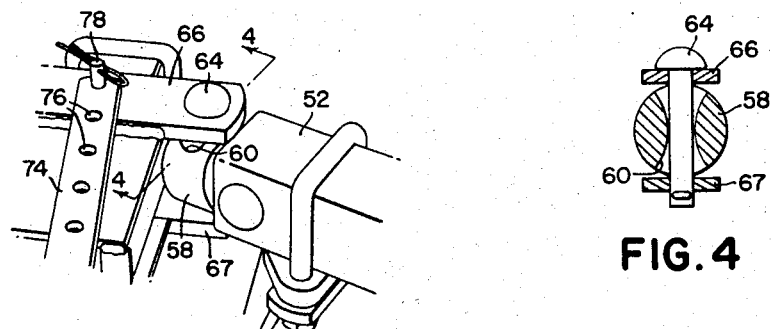
FIG. 3
FIG. 4
INVENTORS.
CHARLES H. YOUNGBERG
HAROLD V. HANSEN
BY
*John C. Thompson*
ATTORNEY United States Patent Office 3,454,106
Patented July 8, 1969

3,454,106
DISK HARROW
Charles Harold Youngberg, Moline, and Harold Valentine Hansen, Cordova, Ill., assignors to Deere & Company, Moline, Ill., a corporation of Delaware
Filed Sept. 26, 1966, Ser. No. 582,088
Int. Cl. A01b 21/08, 7/00, 15/16
U.S. Cl. 172—595                8 Claims

ABSTRACT OF THE DISCLOSURE

A double action tandem disk harrow in which the disk gang frames are pivotally mounted to the main frame at points substantially directly above the disk gangs for pivotal movement about an axis generally parallel to the axis of the disk gangs. Force-applying means normally yieldingly maintain the disk gangs directly below the pivotal mounting but permit the disk gangs to swing rearwardly and upwardly upon striking an obstruction.

---

The present invention relates generally to agricultural implements and more particularly to disk harrows and the like.

In prior art disk harrows, the disks are more likely to be damaged, should they encounter a stump or rock, when mounted on a rigid frame than when they are mounted for movement relative to the carrying frame. Therefore, it has been suggested in the prior art that the disks of a harrow could be mounted for swinging movement with the provision of spring means to normally hold the disks in their normal working position. In one form of prior art devices, the gangs of disks have been mounted on trailing arms that are pivotally secured at their forward ends for swinging movement about a generally transverse axis, there being spring means to the rear of the disks as in U.S. Patents 442,050, 742,988, and 785,493 or the spring means being forward of the disks but behind the pivot as in U.S. Patents 583,914, 628,028, and 1,297,302. This particular form of disk harrow did not meet with commercial success and more recent patents show another form of pivoted construction wherein the disks are carried about a generally fore-and-aft extending axis, one end of the disk gang being able to move upwardly against a spring, this construction being shown in U.S. Patents 1,007,982, 1,022,915, and 2,675,659 and also 2,762,182. This particular form of construction has the disadvantage that should an intermediate disk encounter an obstruction, it is still necessary for the entire frame to be lifted for the disk to pass over the obstruction, thus causing excessive damage to the center disks. Another prior art approach has been to mount the disks for individual vertical movement, this being shown in U.S. Patent 1,817,851. A still further prior art construction is shown in U.S. Patent 2,907,394 in which the entire harrow is mounted for swinging movement against a spring as it is carried on the three-point hitch of a tractor.

In all the preceding prior art devices, it is necessary for the disks to initially move upwardly when they encounter an obstruction. It is a principal feature of this invention to provide a disk harrow construction in which the disks are mounted for pivoted spring resisted movement where the initial movement is to the rear. This has been accomplished by mounting the aligned disks of the disk gang below the point of pivotal connection of the gangs to the frame.

It is a further object of this invention to provide a novel force-applying structure to normally hold the disks in their working position but which permits the disks to swing rearwardly when an obstruction is encountered.

It is a further object of this invention to provide means for adjusting the cut of the disks in a harrow in which the disk gangs are mounted in such a way that they can swing to the rear should an obstruction be encountered.

These and other objects and advantages of this invention will be apparent to those skilled in the art after a consideration of the following detailed description, taken in conjunction with the accompanying drawings in which the preferred form of this invention is illustrated.

FIG. 2 is an enlarged perspective view of the force-applying means for the left rear gang of FIG. 1 showing the manner in which the disk gang is normally held in its normal working position, the force-applying structure permitting the disk gangs to swing rearwardly should an obstruction be encountered.

FIG. 3 is a perspective view showing the manner in which the inner ends of the disk gangs are secured to the main frame of the harrow.

FIG. 4 is a section along the line 4—4 in FIG. 3.

Figure 1:
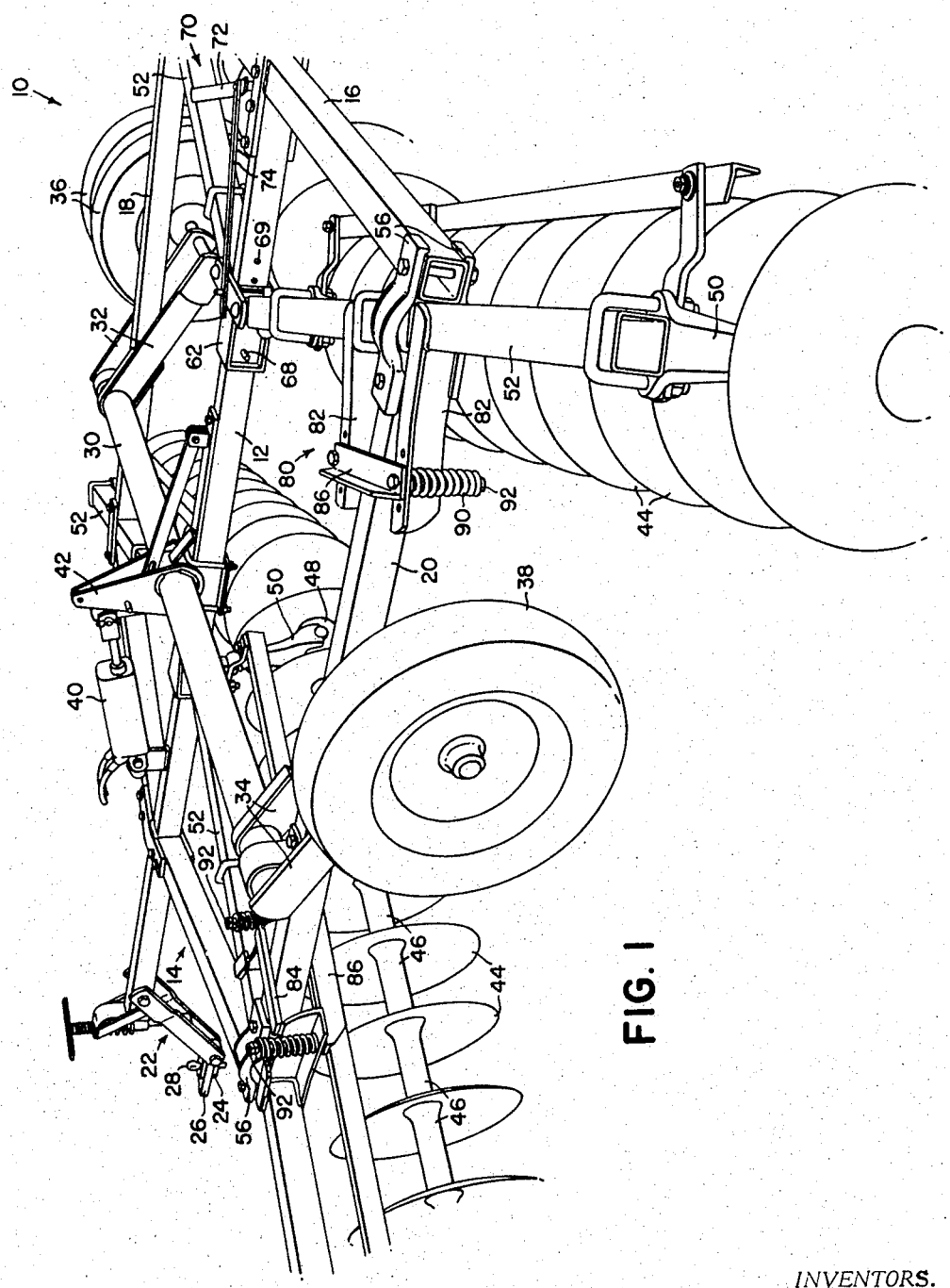
FIG. 1 is a perspective view of a double-action tandem disk harrow in which the principles of this invention have been incorporated.

In the following description, right-hand and left-hand reference is determined by standing to the rear of the disk harrow and facing the direction of travel.

The double-action tandem disk harrow, indicated generally at 10, and in which the principles of this invention have been incorporated, has a rigid generally rectangular framework which includes a longitudinally extending main frame member 12, a front transverse frame structure, indicated generally at 14, the front frame structure being rigidly secured at its midportion to the forward end of the main frame member 12, and a rear transverse frame structure 16 which is in turn rigidly secured at its midportion to the rearward end of the main frame member 12. Rigidly interconnected with the outer ends of the transverse frame structures 14 and 16 are right-hand and left-hand longitudinally extending outer frame members 18 and 20, respectively. A forwardly extending draft frame 22 is interconnected with the longitudinally extending main frame member 12, the draft frame having a clevis 24 which is normally secured to a tractor drawbar 26 by means of a pin 28.

A rockshaft 30 is secured for rotation to the longitudinally extending frame members 12, 18 and 20, the rockshaft carrying at its outer ends rock arms 32, 34 which in turn carry land-engaging wheels. A pair of wheels 36 can be carried by one of the rock arms 32 when disking in soft ground or only one wheel 38 may be carried as when disking in hard ground. The rockshaft is caused to be rotated by an extensible and retractable hydraulic motor 40 that is mounted at its forward end to the frame 12 and which is secured at its rear end to a rock arm 42 carried by the rockshaft 30. Extension of the hydraulic motor 40 will cause the wheels to be moved downwardly relative to the frame, thereby raising the disk harrow to its transport position, while retraction of the cylinder 40 will cause the frame to be moved into its normal ground-working position.

Front and rear pairs of disk gangs are carried by the longitudinally extending frame members and each disk gang includes a plurality of aligned disks 44 which are rotatably disposed about a gang bolt (not shown) and which are held in spaced apart relation by spools or spacers 46. A bearing 48 is carried at the lower end of each of the standards 50 and interconnects the aligned disks with the gang frame 52.

According to the principles of this invention, each of the gang bars 52 is normally disposed directly above the axis of the aligned disks 44 (as can be best seen from FIG. 1), the bar being mounted to rotate about its axis. To this end each bar is provided with upper and lower bearing blocks 54 which are rigidly secured to an intermediate portion of the bar 52. The bearing blocks 54 are disposed within curved bearing members 56 that interconnect the spaced apart transversely extending frame members 14 and 16 with the right- and left-hand outer frame structures 18 and 20.

The inner ends of the bars 52 are provided with a cylindrically extending portion 58 which is apertured as at 60, the aperture being narrower in its midportion than at its upper and lower ends as can be seen from FIG. 4. The inner end 58 is secured to the longitudinally extending main frame member 12 by a slide structure 62 which is slidable about the member 12, the slide structure having vertically disposed pins 64 carried by upper and lower transversely extending bars 66, 67. The pin 64 is disposed within the aperture 60 of the cylindrical portion 58. Thus, as can be seen, the bar 52 can rotate about its own axis. The slide 62 can be held in selected positions of longitudinal adjustment by means of a removable pin 68 which is received within apertures 69 on the main frame member 12. To facilitate longitudinal adjustment an adjusting assembly 70 is provided. This assembly includes a first arm 72 which is pivotally secured at one end to the frame member 12, and a second arm 74 which is pivotally secured to the first arm 72 adjacent the point of pivotal connection of the first arm to the frame member 12, the second arm 74 being provided with a plurality of apertures 76 which may be disposed about an upstanding pin 78 on one end of the slide 62. By removing the pin 68, disposing one of the apertures in the arm 74 about the pin 78, and moving the arm 72 forwardly or rearwardly, the slide can be moved in the same direction.

A resilient force-applying structure, indicated generally at 80, normally maintains the aligned disks 44 directly below the frame bar 52 but permits the disks to move to the rear should they encounter an obstruction during disking, the disk gang assembly rotating about the axis of the bar 52. The force-applying structure includes a pair of longitudinally extending arms 82 which extend forwardly of the bar 52 for the rear gangs and rearwardly from the front bar 52 for the front gangs, the ends of the arms 82 being rigidly secured to the bar 52. The other ends of the arms 82 carry a stop member 84 which is welded to the arms 82. This stop is disposed above the outer frame members 18 and 20 for the forward force-applying structures and below the frame structures 18 and 20 for the rear force-applying structures. A strap 86 is disposed to the other side of the outer frame structure and is interconnected with the arms 82 by means of studs 88, one end of each of the studs being disposed to one side of the strap 86, the elongated portion passing through apertures in the strap 86 and arm 82 and within a compression spring 90, the compression spring 90 being held in place by a nut and washer 92 received on the other end of the stud 88.

In operation should one of the disk gangs encounter an obstruction, as for example the left rear gang, the forward ends of the arms 82 may move downwardly, compressing the spring 90 between the ends of the arms 82 and the nut and washer assembly 92. In normal operating position, the spring 90 will hold the arm 82 in its upper position with the stop 84 contacting one side of the outer member 20.

What is claimed is:

1. A disk harrow comprising: a main frame including a plurality of longitudinally extending frame means; forwardly extending means mounted on said main frame and operable to interconnect said main frame with a propelling device; a plurality of generally transversely extending disk gangs, each of said disk gangs including a plurality of aligned disks, a generally transversely extending gang frame parallel to said disks, gang standards interconnecting the disks with the gang frame; means mounting one end of each of said gang frames to one of said longitudinally extending frame means for rotation about an axis generally transverse to said one longitudinally extending frame means; means mounting each of said gang frames intermediate its ends to another of said longitudinally extending frame means for rotation about an axis generally transverse to said another longitudinally extending frame means; and force-applying means acting between each of said gang frames and the associated one of said another longitudinally extending frame means and operable to normally hold said disks directly below said axes but permitting said disks to swing rearwardly if an obstruction is encountered.

2. The disk harrow set forth in claim 1 in which each of said force-applying means comprises longitudinally extending arm means carried by the gang frame, a stop carried by said arm means and contactable with one side of the associated one of said another longitudinally extending frame means to limit rotation in one direction, and resilient means operable to normally bias the stop towards the associated one of said another longitudinally extending frame means.

3. A disk harrow comprising: a main frame including a plurality of longitudinally extending frame means; forwardly extending means mounted on said main frame and operable to interconnect said main frame with a propelling device; a plurality of generally transversely extending disk gangs, each of said disk gangs including a plurality of aligned disks, a generally transversely extending gang frame parallel to said disks, gang standards interconnecting the disks with the gang frame; means mounting said gang frame to spaced apart longitudinally extending frame means for generally transverse rotational movement at a point normally above the axis of the aligned disks; said means mounting each of the gang frames including a bearing block disposed on a midportion of the gang frame, spaced apart bearing members on one of the longitudinally extending frame means which encircles the bearing block, a generally vertically extending pin carried by another of the longitudinally extending frame means, an aperture in the gang frame which receives the pin, said aperture being narrower in its midportion than at its ends; and force-applying means operable to normally hold said disks directly below said point of rotational movement but permitting said disks to swing rearwardly if an obstruction is encountered.

4. The disk harrow set forth in claim 3 in which said pin is carried on a slide, the slide being movable to selected positions of fore-and-aft adjustment on one of the longitudinally extending main frame means.

5. A disk harrow comprising: a main frame including a plurality of longitudinally extending frame means; forwardly extending means mounted on said main frame and operable to interconnect said main frame with a propelling device; a plurality of generally transversely extending disk gangs, each of said disk gangs including a plurality of aligned disks, a generally transversely extending gang frame parallel to said disks, gang standards interconnecting the disks with the gang frame; means mounting said gang frame to spaced apart longitudinally extending frame means for generally transverse rotational movement at a point normally above the axis of the aligned disks; and force-applying means operable to normally hold said disks directly below said point of rotational movement but permitting said disks to swing rearwardly if an obstruction is encountered; each of said force-applying means comprising a pair of longitudinally extending arm means carried by the gang frame, transversely extending stop means carried by the outer end of said pair of longitudinally extending arm means and contactable with one side of said longitudinally extending frame means to limit rotation in one direction, a transversely extending strap contactable with another side of the longitudinally extending frame means, a pair of generally vertically extending studs carried at one end on the strap and passing through an aperture in the arms, and compression spring means disposed about the studs and in engagement with the arm.

6. A double-action tandem disk harrow comprising: a rigid longitudinally extending main frame member; front and rear generally transversely extending spaced apart frame structures rigidly secured at their midportions to front and rear ends of said main frame member, respectively; right-hand and left-hand longitudinally extending outer frame members rigidly interconnected at their ends to the ends of said transverse frame structures; front and rear pairs of disk gangs movable between an angled working position and a transport position, each of said pairs including right and left disk gangs; each of said disk gangs including a plurality of aligned disks, a generally transversely extending gang bar parallel to said disks, vertically extending standards having one end interconnected with said disks and the other with said gang bar; means mounting each of said gang bars to one of the outer frame structures and to the longitudinally extending main frame member for generally transverse rotational movement about the axis of the gang bar; and resilient force-applying means interposed between each of the gang bars and one of the outer frame structures and operable to normally hold said aligned disks directly below said point of rotational movement but permitting said disks to swing rearwardly if an obstruction is encountered.

7. The double-action tandem disk harrow set forth in claim 6 in which each of the resilient force-applying means comprises a pair of longitudinally extending arm means carried by the gang bar, transversely extending stop means carried by the outer end of said pair of longitudinally extending arm means and contactable with one side of one of the outer frame structures to limit rotation in one direction, a transversely extending strap contactable with another side of the outer frame structures, a pair of generally vertically extending studs carried at one end on the strap and each stud passing through an aperture in the associated longitudinally extending arm, and compression spring means disposed about the studs and in engagement with the arm.

8. The double-action tandem disk harrow set forth in claim 6 in which the means mounting each of the gang frames includes a bearing block disposed on a midportion of the gang bar, spaced apart bearing members, said bearing members interconnecting the ends of the outer frame members with the ends of the transverse frame structures, the bearing members encircling the bearing block, a slide movable to selected positions of fore-and-aft adjustment on the main frame member, a generally vertically extending pin carried by said slide, and an aperture in the end of the gang bar which receives the pin, said aperture being narrower in its midportion than at its upper and lower ends.

References Cited

UNITED STATES PATENTS

| 1,081,521 | 12/1913 | Sumrall et al. | 172—551 X |
| 1,386,132 | 8/1921 | Rodemeyer | 172—572 X |
| 1,941,504 | 1/1934 | White | 172—572 |
| 2,729,929 | 1/1956 | Mason | 172—579 |
| 2,974,738 | 3/1961 | Walberg | 172—572 X |
| 2,985,248 | 5/1961 | Richardson | 172—570 X |

FOREIGN PATENTS

| 232,801 | 2/1961 | Australia. |
| 669,977 | 8/1929 | France. |

ANTONIO F. GUIDA, *Primary Examiner.*

ALAN E. KOPECKI, *Assistant Examiner.*

U.S. Cl. X.R.

172—568